(12) United States Patent
Sato

(10) Patent No.: US 12,673,680 B2
(45) Date of Patent: Jul. 7, 2026

(54) CONTROLLER AND CONTROL METHOD FOR MANEUVERING A SADDLED VEHICLE

(71) Applicant: Robert Bosch GmbH, Stuttgart (DE)

(72) Inventor: Akira Sato, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 18/573,533

(22) PCT Filed: Jun. 24, 2022

(86) PCT No.: PCT/IB2022/055871
§ 371 (c)(1),
(2) Date: Dec. 22, 2023

(87) PCT Pub. No.: WO2022/269553
PCT Pub. Date: Dec. 29, 2022

(65) Prior Publication Data
US 2024/0286612 A1 Aug. 29, 2024

(30) Foreign Application Priority Data

Jun. 25, 2021 (JP) ................................. 2021-105860

(51) Int. Cl.
*B60W 30/16* (2020.01)
(52) U.S. Cl.
CPC ......... *B60W 30/16* (2013.01); *B60W 2300/36* (2013.01); *B60W 2520/10* (2013.01);
(Continued)
(58) Field of Classification Search
CPC .... B60W 30/14; B60W 30/16; B60W 30/162; B60W 30/165; B60W 30/17;
(Continued)

(56) References Cited

U.S. PATENT DOCUMENTS

2003/0190996 A1* 10/2003 Yone ..................... F02D 11/105
477/120
2007/0276577 A1* 11/2007 Kuge .................. B60W 10/184
340/436
(Continued)

FOREIGN PATENT DOCUMENTS

CA 2590273 A1 * 1/2008 ............ B60W 10/11
CN 112019748 A * 12/2020 ......... H04N 23/6812
(Continued)

OTHER PUBLICATIONS

International Search Report and Written Opinion for Application No. PCT/IB2022/055871 dated Oct. 11, 2022 (11 pages).

*Primary Examiner* — Erin M Piateski
*Assistant Examiner* — Ashley Tiffany Schoech
(74) *Attorney, Agent, or Firm* — Michael Best & Friedrich LLP

(57) ABSTRACT

The present disclosure provides a controller and a control method appropriately improving safety of a saddled vehicle. According to the controller and the control method according to the present disclosure, a controller maneuvers a saddled vehicle and has a control section. The control section executes a distance control in which a distance between the saddled vehicle and a target vehicle is controlled based on surrounding environment information of the saddled vehicle. The control section initiates the distance control according to a first operation in which a rider of the saddled vehicle operates an operation unit to change a reference state of the operation unit to a different state that is different from the reference state. The control section
(Continued)

terminates the distance control according to a second operation in which the rider returns the operation unit to the reference state during execution of the distance control.

16 Claims, 5 Drawing Sheets

(52) U.S. Cl.
CPC ..... *B60W 2520/26* (2013.01); *B60W 2540/10* (2013.01); *B60W 2710/18* (2013.01); *B60W 2754/30* (2020.02)

(58) Field of Classification Search
CPC ....... B60W 2300/36; B60W 2300/362; B60W 2300/365; B60W 2300/367; B60W 2520/10; B60W 2520/26; B60W 2520/263; B60W 2520/266; B60W 2540/10; B60W 2540/106; B60W 2540/12; B60W 2710/18; B60W 2754/30; B60W 2520/105; B60W 10/04; B60W 10/06; B60W 2554/802; B60W 2720/106; B60L 2240/14; B60L 2240/16
See application file for complete search history.

(56) References Cited

U.S. PATENT DOCUMENTS

| | | | | |
|---|---|---|---|---|
| 2009/0105923 | A1* | 4/2009 | Etori | B60W 10/18 |
| | | | | 701/96 |
| 2011/0066350 | A1* | 3/2011 | Sonoda | B60W 30/16 |
| | | | | 701/96 |
| 2017/0066443 | A1* | 3/2017 | Kobayashi | B60W 30/16 |
| 2017/0113555 | A1* | 4/2017 | Park | B60L 15/2009 |
| 2020/0156607 | A1 | 5/2020 | Ueno et al. | |
| 2020/0239101 | A1* | 7/2020 | Oshiro | F02D 11/04 |
| 2021/0094542 | A1* | 4/2021 | Horiguchi | B60T 7/042 |
| 2022/0379887 | A1* | 12/2022 | Dieckmann | G08G 1/22 |

FOREIGN PATENT DOCUMENTS

| | | | | | |
|---|---|---|---|---|---|
| DE | 102018201306 | A1 * | 8/2019 | ........... | B60W 50/10 |
| EP | 3708475 | A1 | 9/2020 | | |
| EP | 3723065 | A1 | 10/2020 | | |
| JP | 2009116882 | A | 5/2009 | | |
| WO | 2009022968 | A1 | 2/2009 | | |

* cited by examiner

[FIG. 1]
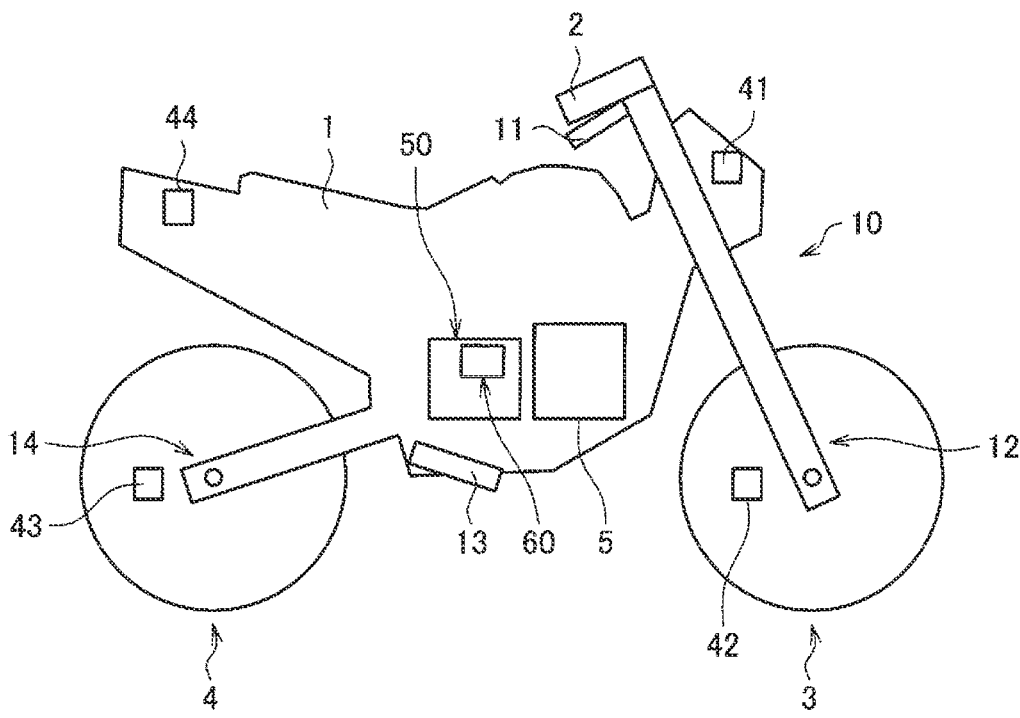

[FIG. 2]
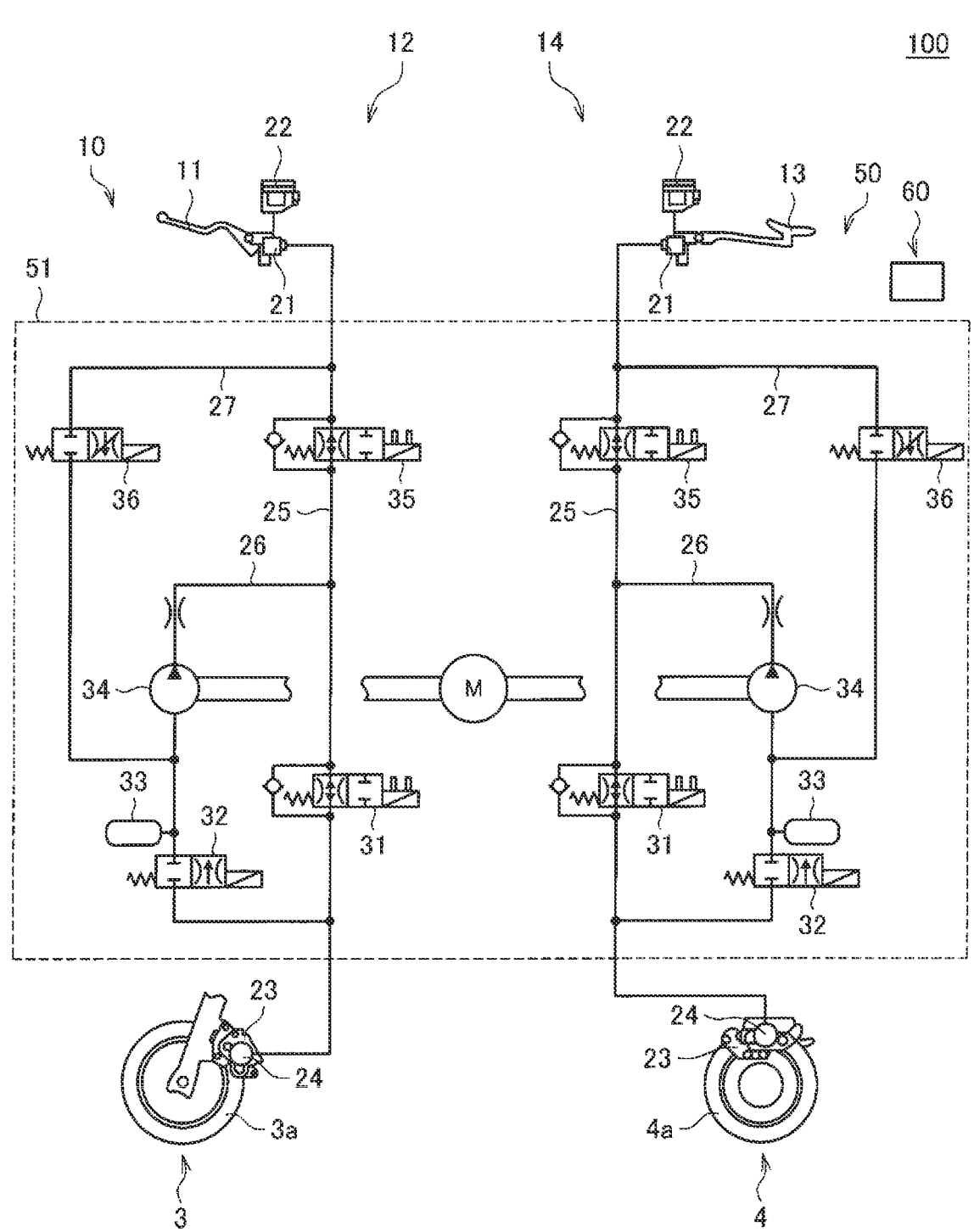

[FIG. 3]
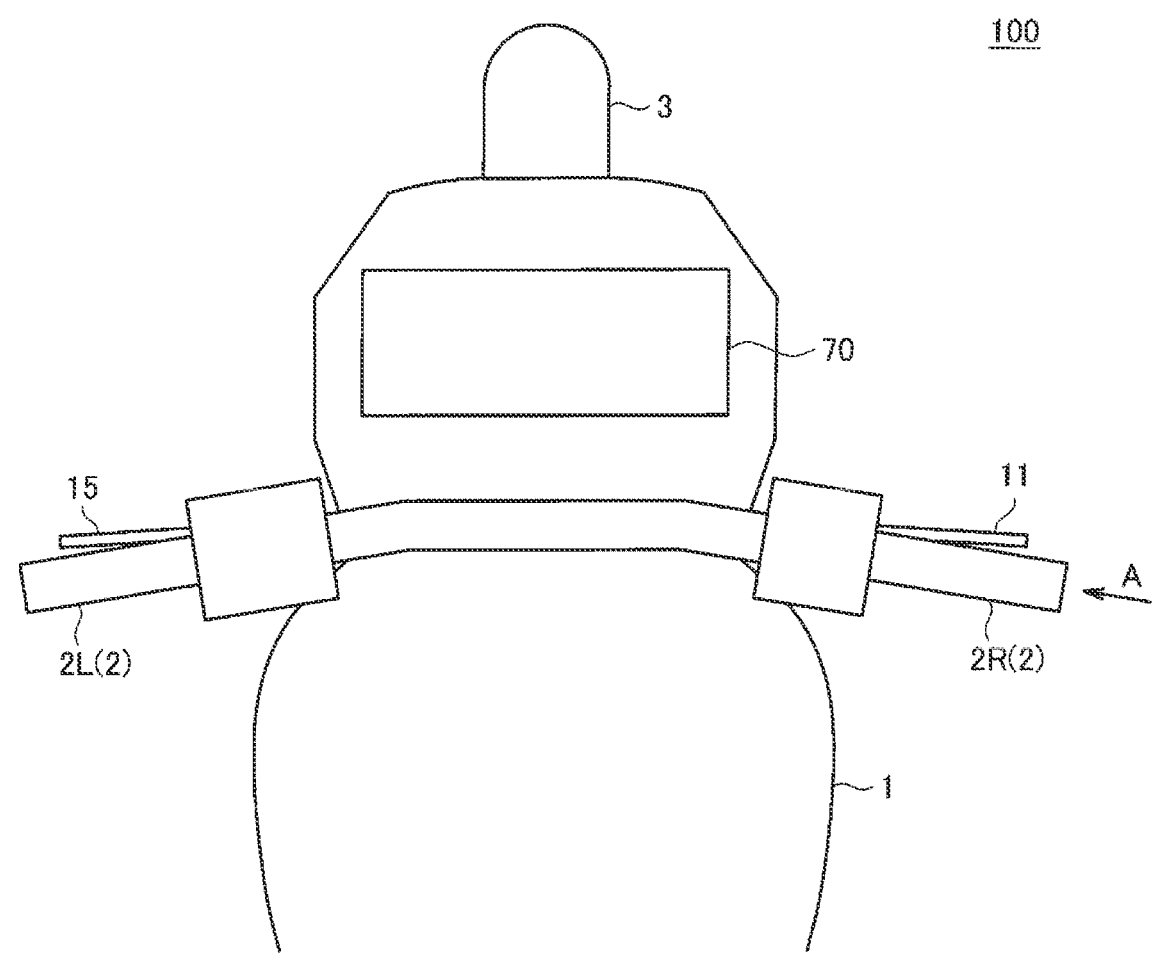
[FIG. 4]
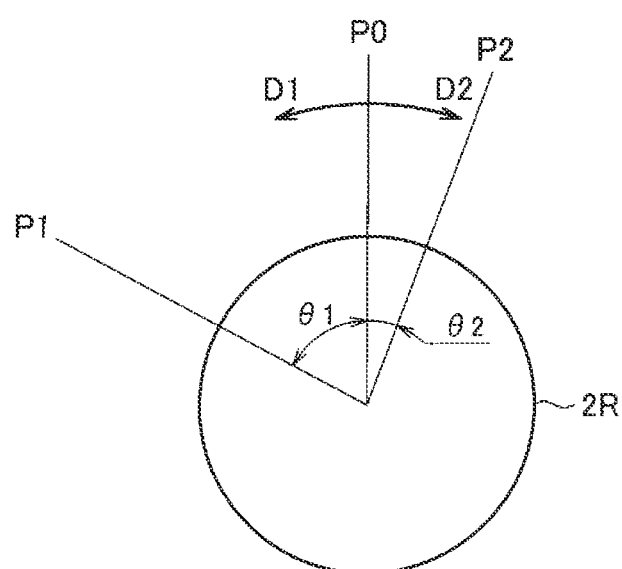

CONTROLLER AND CONTROL METHOD FOR MANEUVERING A SADDLED VEHICLE

BACKGROUND OF THE INVENTION

The present disclosure relates to a controller and a control method capable of appropriately improving safety of a saddled vehicle.

Various techniques are known as related to saddled vehicles and as improving safety of saddled vehicles.

For example, JP 2009-116882 A discloses a driver assistance system for a motorcycle. The driver assistance system has a sensor that detects an object located in front of a saddled vehicle in a travel direction of the saddled vehicle or substantially in the travel direction. The driver assistance system notifies a rider of the saddled vehicle that the motorcycle is approaching the object in appropriately based on the detection results of the sensor.

As techniques to improve safety of vehicles, a distance control, in which a distance between a subject vehicle and a target vehicle is controlled, is known. It is considered to perform such a distance control in a saddled vehicle to improve safety. The distance control is required to be performed in the saddled vehicle to improve safety of the saddled vehicle suitably.

SUMMARY OF THE INVENTION

The present disclosure addresses the above-described issues. Thus, it is an objective of the present disclosure to provide a controller and a control method to improve safety of saddled vehicle suitably.

As one aspect of the present disclosure, a controller maneuvers a saddled vehicle. The controller has a control section that executes a distance control in which a distance between the saddled vehicle and a target vehicle is controlled. The control section executes the distance control based on surrounding environment information of the saddled vehicle. The control section initiates the distance control according to a first operation in which a rider of the saddled vehicle operates an operation unit to change a reference state of the operation unit to a different state that is different from the reference state. The control section terminates the distance control according to a second operation in which the rider returns the operation unit to the reference state during execution of the distance control.

As one aspect of the present disclosure, a control method is provided for maneuvering a saddled vehicle. The control method includes executing, using a control section of a controller, a distance control in which a distance between the saddled vehicle and a target vehicle is controlled. The control section executes the distance control based on surrounding environment information of the saddled vehicle. The control section: initiate the distance control according to a first operation in which a rider of the saddled vehicle operates an operation unit to change a reference state of the operation unit to a different state that is different from the reference state; and terminate the distance control according to a second operation in which the rider returns the operation unit to the reference state during execution of the distance control.

According to the controller and the control method according to the present disclosure, a controller maneuvers a saddled vehicle and has a control section. The control section executes a distance control in which a distance between the saddled vehicle and a target vehicle is controlled based on surrounding environment information of the saddled vehicle. The control section: initiates the distance control according to a first operation in which a rider of the saddled vehicle operates an operation unit to change a reference state of the operation unit to a different state that is different from the reference state; and terminates the distance control according to a second operation in which the rider returns the operation unit to the reference state during execution of the distance control. Therefore, the distance control is performed in line with the rider's intentions. As such, safety of the saddled vehicle is improved suitably.

BRIEF DESCRIPTION OF THE DRAWINGS

FIG. 1 is a schematic view illustrating an outline configuration of a saddled vehicle according to an embodiment of the present disclosure.

FIG. 2 is a schematic view illustrating an outline configuration of a brake system according to the embodiment of the present disclosure.

FIG. 3 is a schematic view illustrating an outline configuration of a handlebar and surroundings thereof according to the embodiment of the present disclosure.

FIG. 4 is a schematic view illustrating a rotational direction of an accelerator grip according to the embodiment of the present disclosure.

DETAILED DESCRIPTION

Figure 5:
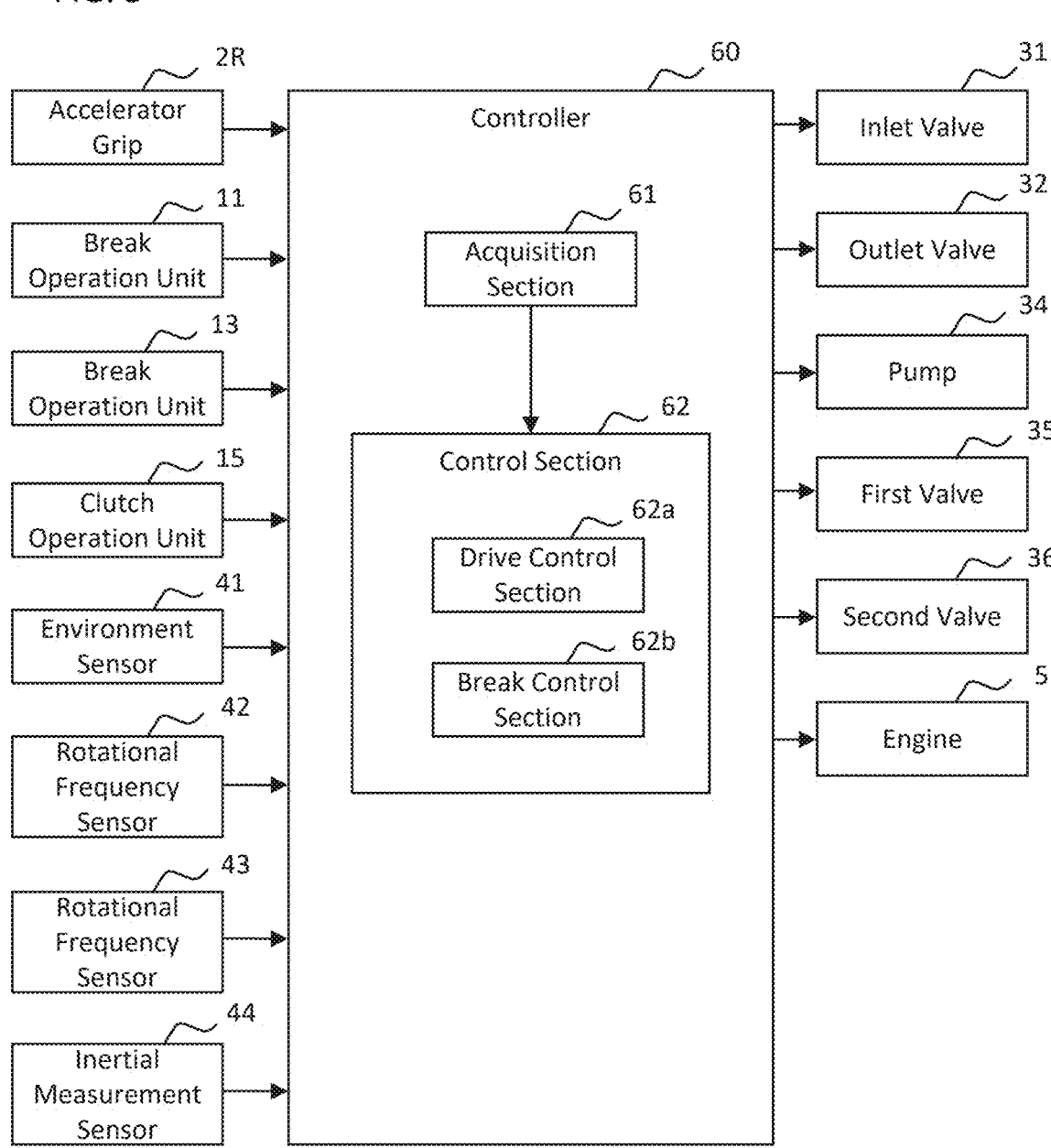
FIG. 5 is a block diagram illustrating an example of a functional configuration of a controller according to the embodiment of the present disclosure.

A description will hereinafter be made on a controller according to the present disclosure with reference to the drawings.

The following description will be made on the controller that is used for a two-wheeled motorcycle (see a saddled vehicle 100 in FIG. 1). However, a vehicle as a control target of the controller according to the present disclosure only needs to be a saddled vehicle, and may be a saddled vehicle other than the two-wheeled motorcycle. The saddled vehicle means a vehicle that a rider straddles. Examples of the saddled vehicle are motorcycles (a two-wheeled motor vehicle and a three-wheeled motor vehicle), a pedal-driven vehicle, and an all-terrain vehicle.

The motorcycles include a vehicle having an engine as a power source, a vehicle having an electric motor as a power source, and the like. Examples of the motorcycles are a motorbike, a scooter, and an electric scooter. The pedal-driven vehicle means a vehicle capable of traveling forward on a road by a depression force applied to pedals by the rider. Examples of the pedal-driven vehicle are a normal pedal-driven vehicle, an electrically-assisted pedal-driven vehicle, and an electric pedal-driven vehicle.

In addition, the following description will be made on a case where the engine (more specifically, an engine 5 in FIG. 1, which will be described below) is mounted as a drive source that can output power for driving a wheel. However, as the drive source, a drive source other than the engine (for example, the electric motor) may be mounted, or plural drive sources may be mounted.

A configuration, operation, and the like, which will be described below, merely constitute one example. The controller and the control method according to the present disclosure are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Saddled Vehicle>

A description will be made on a configuration of the saddled vehicle 100 according to the embodiment of the present disclosure with reference to FIG. 1 to FIG. 3.

FIG. 1 is a schematic view illustrating an outline configuration of the saddled vehicle 100. FIG. 2 is a schematic view illustrating an outline configuration of a brake system 10.

The saddled vehicle 100 is a two-wheeled motorcycle that corresponds to an example of the saddled vehicle according to the present disclosure. As illustrated in FIG. 1 and FIG. 2, the saddled vehicle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; the engine 5; the brake system 10; a surrounding environment sensor 41; a front-wheel rotational frequency sensor 42; a rear-wheel rotational frequency sensor 43; and an inertial measurement unit 44. In this embodiment, a controller (ECU) 60 is provided to a hydraulic pressure control unit 50 in the brake system 10, which will be described later.

The engine 5 corresponds to an example of the drive source for the saddled vehicle 100, and can output power for driving the wheel (more specifically, the rear wheel 4). For example, the engine 5 is provided with: one or plural cylinders, each of which is formed with a combustion chamber therein; a fuel injector that injects fuel into the respective combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston that is provided in the cylinder reciprocates to rotate a crankshaft. In addition, a throttle valve is provided to an intake pipe of the engine 5, and an intake air amount for the combustion chamber varies according to a throttle opening amount as an opening amount of the throttle valve.

As illustrated in FIG. 1 and FIG. 2, the brake system 10 includes: a first brake operation unit 11; a front-wheel brake mechanism 12 that brakes the front wheel 3 in an interlocking manner with at least the first brake operation unit 11; a second brake operation unit 13; and a rear-wheel brake mechanism 14 that brakes the rear wheel 4 in an interlocking manner with at least the second brake operation unit 13. The brake system 10 also includes the hydraulic pressure control unit 50, and the front-wheel brake mechanism 12 and the rear-wheel brake mechanism 14 are partially included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake operation unit 11 is provided to the handlebar 2 and is operated by the rider's hand. The first brake operation unit 11 is a brake lever, for example. The second brake operation unit 13 is provided to a lower portion of the trunk 1 and is operated by the rider's foot. The second brake operation unit 13 is a brake pedal, for example.

Each of the front-wheel brake mechanism 12 and the rear-wheel brake mechanism 14 includes: a master cylinder 21 in which a piston (not illustrated) is installed; a reservoir 22 that is attached to the master cylinder 21; a brake caliper 23 that is held by the trunk 1 and has a brake pad (not illustrated); a wheel cylinder 24 that is provided to the brake caliper 23; a primary channel 25 through which a brake fluid in the master cylinder 21 flows into the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided to the primary channel 25. The secondary channel 26 bypasses a portion of the primary channel 25 between the wheel cylinder 24 side and the master cylinder 21 side of the inlet valve 31. The secondary channel 26 is sequentially provided with an outlet valve (AV) 32, an accumulator 33, and a pump 34 from an upstream side. Between an end on the master cylinder 21 side of the primary channel 25 and a portion of the primary channel 25 to which a downstream end of the secondary channel 26 is connected, a first valve (USV) 35 is provided. The supply channel 27 communicates between the master cylinder 21 and a portion on a suction side of the pump 34 in the secondary channel 26. A second valve (HSV) 36 is provided to the supply channel 27.

The inlet valve 31 is an electromagnetic valve that is opened in an unenergized state and is closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

The hydraulic pressure control unit 50 includes: components such as the inlet valves 31, the outlet valves 32, the accumulators 33, the pumps 34, the first valves 35, and the second valves 36 used to control a brake hydraulic pressure; a base body 51 to which those components are provided and in which channels constituting the primary channels 25, the secondary channels 26, and the supply channels 27 are formed; and the controller 60.

The base body 51 may be formed of one member or may be formed of plural members. In addition, in the case where the base body 51 is formed of the plural members, the components may separately be provided to the different members.

The controller 60 controls operation of each of the components in the hydraulic pressure control unit 50. As a result, the braking force to be generated on the front wheel 3 by the front-wheel brake mechanism 12 and the braking force to be generated on the rear wheel 4 by the rear-wheel brake mechanism 14 are controlled.

For example, during normal time, that is, when distance control, which will be described below, is not executed, the controller 60 opens the inlet valves 31, closes the outlet valves 32, opens the first valves 35, and closes the second valves 36. When the first brake operation unit 11 is operated in such a state, in the front-wheel brake mechanism 12, the piston (not illustrated) in the master cylinder 21 is pressed to increase the hydraulic pressure of the brake fluid in the wheel cylinder 24, the brake pad (not illustrated) of the brake caliper 23 is then pressed against a rotor 3a of the front wheel 3, and the braking force is thereby generated on the front wheel 3. Meanwhile, when the second brake operation unit 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby generated on the rear wheel 4.

The surrounding environment sensor 41 detects surrounding environment information on surrounding environment of the saddled vehicle 100. For example, the surrounding environment sensor 41 is provided to a front portion of the trunk 1 of the saddled vehicle 100, and detects the surrounding environment information in front of the saddled vehicle 100. The surrounding environment information detected by the surrounding environment sensor 41 is output to the controller 60.

The surrounding environment information detected by the surrounding environment sensor 41 may be information on a distance to or an orientation of a target object located around the saddled vehicle 100 (for example, a relative position, a relative distance, a relative speed, relative acceleration, or the like), or may be a characteristic of the target object located around the saddled vehicle 100 (for example, a type of the target object, a shape of the target object itself, a mark on the target object, or the like). Examples of the surrounding environment sensor 41 are a radar, a Lidar sensor, an ultrasonic sensor, and a camera.

However, the surrounding environment information can also be detected by a surrounding environment sensor mounted to another vehicle or by an infrastructure facility. In other words, the controller 60 can also acquire the surrounding environment information via wireless communication with the other vehicle or the infrastructure facility.

The front-wheel rotational frequency sensor 42 is a wheel rotational frequency sensor that detects a rotational frequency of the front wheel 3 (for example, a rotational frequency of the front wheel 3 per unit time [rpm], a travel distance of the front wheel 3 per unit time [km/h], or the like), and outputs a detection result. The front-wheel rotational frequency sensor 42 may detect another physical quantity that can substantially be converted to the rotational frequency of the front wheel 3. The front-wheel rotational frequency sensor 42 is provided to the front wheel 3.

The rear-wheel rotational frequency sensor 43 is a wheel rotational frequency sensor that detects a rotational frequency of the rear wheel 4 (for example, a rotational frequency of the rear wheel 4 per unit time [rpm], a travel distance of the rear wheel 4 per unit time [km/h], or the like), and outputs a detection result. The rear-wheel rotational frequency sensor 43 may detect another physical quantity that can substantially be converted to the rotational frequency of the rear wheel 4. The rear-wheel rotational frequency sensor 43 is provided to the rear wheel 4.

The inertial measurement unit 44 includes a three-axis gyroscope sensor and a three-directional acceleration sensor, and detects a posture of the saddled vehicle 100. The inertial measurement unit 44 is provided to the trunk 1 of the saddled vehicle 100, for example. For example, the inertial measurement unit 44 detects a lean angle of the saddled vehicle 100 and outputs a detection result. The inertial measurement unit 44 may detect another physical quantity that can substantially be converted to the lean angle of the saddled vehicle 100. The lean angle corresponds to an angle representing an inclination in a rolling direction of a body (more specifically, the trunk 1) of the saddled vehicle 100 with respect to an upper vertical direction. The inertial measurement unit 44 may only include parts of the three-axis gyroscope sensor and the three-directional acceleration sensor.

A further detailed description will herein be made on a configuration of the handlebar 2 and surroundings thereof with reference to FIG. 3 and FIG. 4. FIG. 3 is a schematic view illustrating an outline configuration of the handlebar 2 and the surroundings thereof. More specifically, FIG. 3 is a view in which an upper front portion of the trunk 1 of the saddled vehicle 100 is seen from above vertically.

As illustrated in FIG. 3, the handlebar 2 includes a right grip 2R and a left grip 2L. The handlebar 2 extends in a vehicle width direction. The right grip 2R is formed in a right end portion of the handlebar 2 and is grasped by the rider's right hand during travel. The left grip 2L is formed in a left end portion of the handlebar 2 and is grasped by the rider's left hand during the travel. In particular, the right grip 2R is an accelerator grip that is used for an accelerator operation by the rider (that is, an operation to accelerate the saddled vehicle 100). An operation to rotate the accelerator grip corresponds to the accelerator operation. Hereafter, the right grip 2R will also be referred to as the accelerator grip 2R.

The first brake operation unit 11 is provided near the right grip (the accelerator grip) 2R. The rider can grip the first brake operation unit 11 with his/her right hand. An operation to grip the first brake operation unit 11 corresponds to a brake operation (that is, an operation to decelerate the saddled vehicle 100). An operation to depress the above-described second brake operation unit 13 also corresponds to the brake operation. A clutch operation unit 15 is provided near the left grip 2L. The clutch operation unit 15 is a clutch lever, for example. The rider can grip the clutch operation unit 15 with his/her left hand. The operation to grip the clutch operation unit 15 corresponds to a clutch operation (that is, an operation to release a clutch that connects/disconnects power transmission from the engine 5 to a drive wheel).

As illustrated in FIG. 3, a display device 70 is mounted to the saddled vehicle 100. The display device 70 is a device that visually presents various types of information. For example, the display device 70 may show an object indicative of a vehicle speed, an object indicative of a remaining amount of the fuel, and the like. In the example illustrated in FIG. 3, the display device 70 is provided in front of the handlebar 2 in the saddled vehicle 100.

A further detailed description will herein be made on the accelerator grip 2R of the handlebar 2 with reference to FIG. 4. FIG. 4 is a schematic view illustrating the rotational direction of the accelerator grip 2R. More specifically, FIG. 4 is a view in which the accelerator grip 2R is seen in a direction of arrow A in FIG. 3 (that is, a view in which the accelerator grip 2R is seen from a vehicle right side along an axial direction thereof).

The accelerator grip 2R corresponds to an example of the operation unit according to the present disclosure used for the rider's operation to execute the distance control, which will be described below.

More specifically, the accelerator grip 2R has a cylindrical or columnar shape, and can be rotated about a center axis of the accelerator grip 2R. The accelerator grip 2R is movable so that a rotational position of the accelerator grip 2R returns to a reference position P0 while being unloaded, i.e., during an unloaded state. When the accelerator grip 2R is unloaded, i.e., is in the unloaded state, the accelerator grip 2R does not receive a load from external devices. Such a structure can be implemented by using a restoring force of a spring of the like, for example. In this case, an urging force that returns the accelerator grip 2R to the reference position P0 from the rotational position can be applied to the accelerator grip 2 in either a first direction D1 as a counterclockwise direction when seen from the vehicle right side or a second direction D2 as a clockwise direction when seen from the vehicle right side. In a state where the distance control, which will be described below, is canceled, drive power generated to the saddled vehicle 100 is minimized when the rotational position of the accelerator grip 2R is the reference position P0. A state where the rotational position of the accelerator grip 2R is the reference position P0 corresponds to a reference state of the accelerator grip 2R.

In addition, in the state where the distance control, which will be described below, is canceled, the drive power can be generated to the saddled vehicle 100 by rotating the accelerator grip 2R in the first direction D1 from the reference position P0. Here, the drive power generated to the saddled vehicle 100 is increased as a relative angle of the rotational position of the accelerator grip 2R to the reference position P0 is increased. For example, in the case where the rotational position of the accelerator grip 2R is a position P1 in FIG. 4 (more specifically, a position to which the accelerator grip 2R is rotated in the first direction D1 from the reference position P0 by an angle $\theta1$), the drive power that corresponds to the angle $\theta1$ is generated to the saddled vehicle 100.

In the state where the distance control, which will be described below, is canceled and the drive power is generated to the saddled vehicle 100 (more specifically, a state where the rotational position of the accelerator grip 2R is located on the first direction D1 side from the reference position P0), the drive power is increased when the rider rotates the accelerator grip 2R in the first direction D1, and the drive power is reduced when the rider rotates the accelerator grip 2R in the second direction D2 as a reverse direction from the first direction D1.

The controller 60 maneuvers the saddled vehicle 100. For example, the controller 60 is partially or entirely constructed of a microcomputer, a microprocessor unit, or the like. Alternatively, the controller 60 may partially or entirely be constructed of a member in which firmware or the like can be updated, or may partially or entirely be a program module or the like that is executed by a command from a CPU or the like, for example. The controller 60 may be provided as a single unit or may be divided into plural units, for example.

FIG. 5 is a block diagram illustrating an example of a functional configuration of the controller 60. As illustrated in FIG. 5, the controller 60 includes an acquisition section 61 and a control section 62, for example.

The acquisition section 61 acquires the information that is output from each of the devices mounted to the saddled vehicle 100, and outputs the acquired information to the control section 62. For example, the acquisition section 61 acquires information on the various detection results output from the surrounding environment sensor 41, the front-wheel rotational frequency sensor 42, the rear-wheel rotational frequency sensor 43, and the inertial measurement unit 44. In addition, for example, the acquisition section 61 acquires information on operation amounts of various operations accepted by the accelerator grip 2R, the first brake operation unit 11, the second brake operation unit 13, and the clutch operation unit 15 from these operation units. In the present specification, the acquisition of the information can include extraction, generation, and the like of the information.

The control section 62 includes a drive control section 62a and a brake control section 62b, for example.

The drive control section 62a controls the drive power that is transmitted to the wheel. More specifically, the drive control section 62a outputs a command to an engine control unit (not illustrated), which outputs a signal for controlling operation of each of the components (the throttle valve, the fuel injector, the ignition plug, and the like) in the engine 5, and thereby controls operation of the engine 5. In this way, the drive power transmitted from the engine 5 to the wheel is controlled, and acceleration of the saddled vehicle 100 is thereby controlled. The drive control section 62a may output the signal for controlling the operation of each of the components in the engine 5, so as to directly control the operation of each of the components in the engine 5.

The brake control section 62b controls the operation of each of the components in the hydraulic pressure control unit 50 of the brake system 10, and thereby controls the braking force generated on the wheels of the saddled vehicle 100. For example, the brake control section 62b brings the saddled vehicle 100 into a state where the inlet valve 31 is opened, the outlet valve 32 is closed, the first valve 35 is closed, and the second valve 36 is opened, and drives the pump 34 in such a state. In this way, the brake control section 62b increases the hydraulic pressure of the brake fluid in the wheel cylinder 24, and can thereby automatically increase the braking force on the wheel. As a result, deceleration of the saddled vehicle 100 is controlled. The brake control section 62b can separately control the braking force on the front wheel 3 and the braking force on the rear wheel 4 by separately controlling the operation of the front-wheel brake mechanism 12 and the operation of the rear-wheel brake mechanism 14.

As described above, the control section 62 can control the acceleration and the deceleration of the saddled vehicle 100 by controlling the operation of each of the devices mounted to the saddled vehicle 100.

Here, the control section 62 can execute the distance control. In the distance control, a distance between the saddled vehicle 100 and a target vehicle is controlled based on the surrounding environment information of the saddled vehicle 100. Here, the distance may mean a distance in a direction along a lane (more specifically, a travel lane of the saddled vehicle 100) or may mean a straight-line distance. In the distance control, the distance itself may be set as a control target, or another physical quantity that can substantially be converted to the distance may be set as the control target. Examples of the other physical quantity that can substantially be converted to the distance are a passing time difference as a time difference between timing at which the saddled vehicle 100 passes a point and timing at which the target vehicle passes the same point and a time required for the saddled vehicle 100 to catch up with the target vehicle.

For example, the surrounding environment sensor 41 detects, as the surrounding environment information, a distance between the saddled vehicle 100 and a preceding vehicle that travels ahead of the saddled vehicle 100 and a relative speed of the saddled vehicle 100 to the preceding vehicle. Then, for example, in the distance control, the control section 62 sets the preceding vehicle as the target vehicle, and controls the distance between the saddled vehicle 100 and the preceding vehicle based on the surrounding environment information. The distance control is executed by controlling at least one of the acceleration and the deceleration of the saddled vehicle 100.

<Operation of Controller>

A description will be made on operation of the controller 60 according to the embodiment of the present disclosure with reference to FIG. 6 and FIG. 7.

Figure 6:
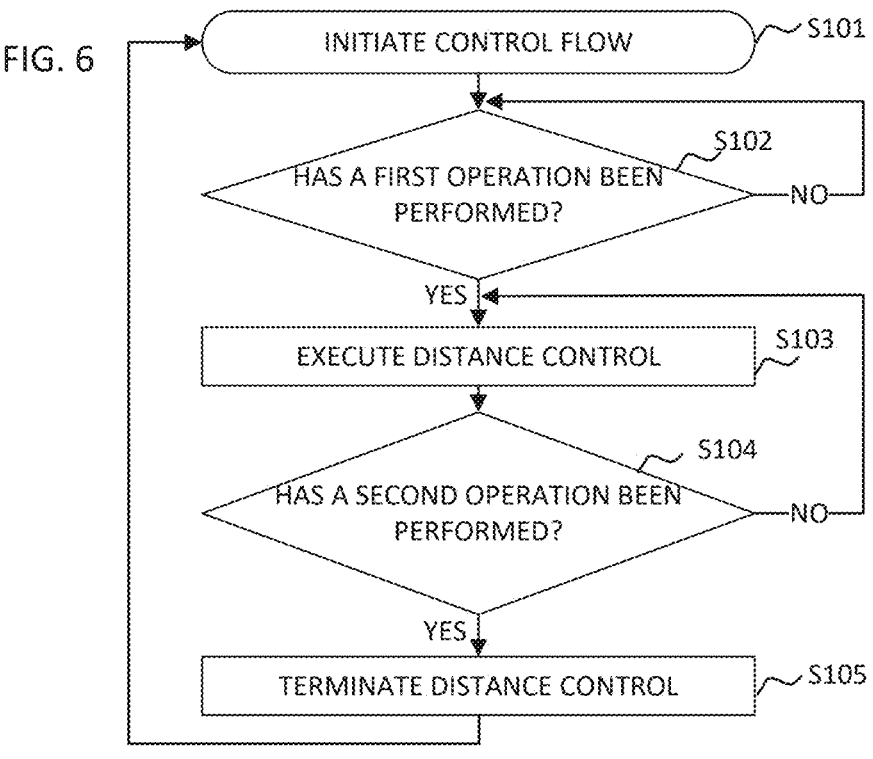
FIG. 6 is a flowchart illustrating an example of a processing procedure that is executed by the controller according to the embodiment of the present disclosure.

FIG. 6 is a flowchart illustrating an example of a processing procedure that is executed by the controller 60. S101 in FIG. 6 corresponds to initiation of a control flow illustrated in FIG. 6.

The control flow illustrated in FIG. 6 advances to S102 when being initiated. At S102, the control section 62 determines whether a first operation has been performed. The first operation is an operation in which the rider operates the accelerator grip 2R so that the reference state of the accelerator grip 2R is changed to a different state that is different from the reference state. More specifically, in the first operation, the rider rotates the accelerator grip 2R in the second direction D2 from the reference position P0 illustrated in FIG. 4. In other words, in the first operation, the rider rotates the acceleration grip 2R in the same direction as the direction to reduce the drive power.

For example, it is determined that the first operation is performed when the accelerator grip 2R is rotated from the reference position P0 to a position P2 shown in FIG. 4. More specifically, when the accelerator grip 2R is rotated from the reference position P0 by an angle θ2 in the second direction D2, the accelerator grip 2R is located at the position P2. Accordingly, when the accelerator grip 2R rotates slightly in the second direction D2 unintentionally, it is possible to prevent from determining, by an error, that the first operation has been performed. The accelerator grip 2R may further be rotated to the second direction D2 side from the position P2.

When it is determined that the first operation has not been performed (S102/NO), the determination at S102 is repeated. On the other hand, when it is determined that the first operation has been performed (S102/YES), the processing proceeds to S103.

If it is determined YES at S102, at S103, the control section 62 executes the distance control. A description will hereinafter be made on an example of a processing procedure in the distance control with reference to FIG. 7.

Figure 7:
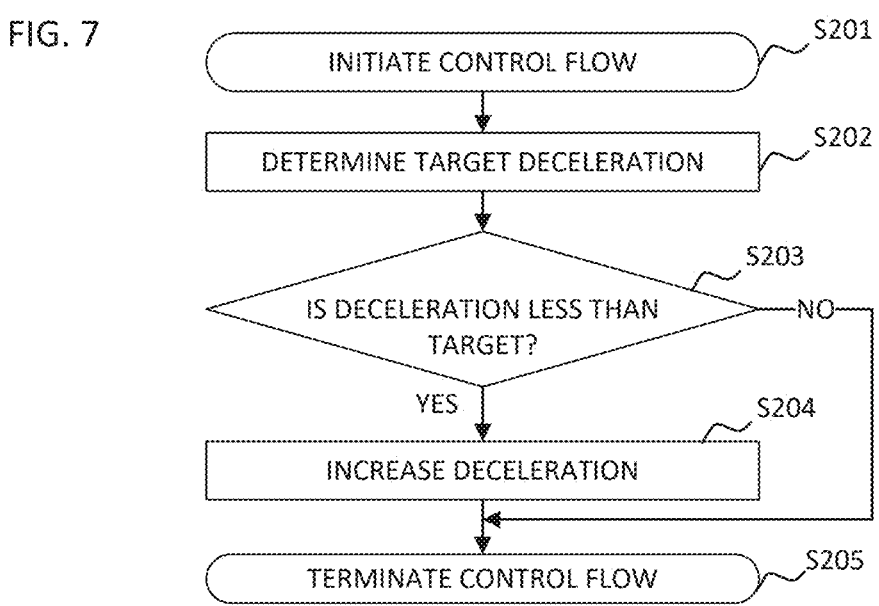
FIG. 7 is a flowchart illustrating an example of a processing procedure in distance control that is executed by the controller according to the embodiment of the present disclosure.

FIG. 7 is a flowchart illustrating an example of the processing procedure in the distance control that is executed by the controller 60. More specifically, a control flow illustrated in FIG. 7 is an example of the processing that is executed at S103 of the control flow illustrated in FIG. 6. S201 corresponds to initiation of the control flow illustrated in FIG. 7. S205 corresponds to termination of the control flow illustrated in FIG. 7.

A description will hereinafter be made on an example in which, in the distance control, the distance is controlled by controlling the deceleration of the saddled vehicle 100 in order to avoid a collision of the saddled vehicle 100 with the preceding vehicle as the target vehicle. However, as will be described below, in the distance control, the distance may be controlled by controlling the acceleration of the saddled vehicle 100. Alternatively, the distance control may be control for maintaining the distance.

When the control flow illustrated in FIG. 7 is initiated, at S202, the control section 62 determines target deceleration based on the surrounding environment information.

At S202, the control section 62 determines the target deceleration, for example, based on the distance between the preceding vehicle and the saddled vehicle 100 and the relative speed of the saddled vehicle 100 to the preceding vehicle. Here, the control section 62 determines the deceleration, at which the collision with the preceding vehicle can be avoided, as the target deceleration. For example, the control section 62 determines, as the target deceleration, the greater deceleration as the distance between the preceding vehicle and the saddled vehicle 100 is reduced. In addition, for example, the control section 62 determines, as the target deceleration, the greater deceleration as the relative speed of the saddled vehicle 100 to the preceding vehicle is increased.

Next, at S203, the control section 62 determines whether the deceleration of the saddled vehicle 100 is less than the target deceleration. The deceleration of the saddled vehicle 100 can be acquired based on transition of the vehicle speed of the saddled vehicle 100. The vehicle speed of the saddled vehicle 100 can be acquired based on the detection result of the front-wheel rotational frequency sensor 42 and the detection result of the rear-wheel rotational frequency sensor 43.

If it is determined that the deceleration of the saddled vehicle 100 is less than the target deceleration (S203/YES), the processing proceeds to S204. On the other hand, if it is not determined that the deceleration of the saddled vehicle 100 is less than the target deceleration (S203/NO), the control flow illustrated in FIG. 7 is terminated.

If it is determined YES at S203, at S204, the control section 62 executes control for increasing the deceleration of the saddled vehicle 100 to the target deceleration, and then the control flow illustrated in FIG. 7 is terminated.

At S204, the control section 62 controls the operation of each of the components in the hydraulic pressure control unit 50 of the brake system 10, so as to enable automatic generation of the braking force to the wheel of the saddled vehicle 100. As a result, even when the rider does not perform the brake operation by using the first brake operation unit 11 or the second brake operation unit 13, the deceleration of the saddled vehicle 100 can automatically be increased.

As described above, in the control flow illustrated in FIG. 7, in the distance control, the control section 62 controls the deceleration of the saddled vehicle 100 based on the surrounding environment information. Here, from a perspective of optimizing the deceleration of the saddled vehicle 100, in the distance control, the control section 62 preferably controls the deceleration of the saddled vehicle 100 (and thus the distance between the saddled vehicle 100 and the target vehicle) based on another type of information in addition to the surrounding environment information.

For example, in the distance control, the control section 62 may control the deceleration of the saddled vehicle 100 based on the vehicle speed of the saddled vehicle 100 in addition to the surrounding environment information. Here, in the case where the significant deceleration is applied to the saddled vehicle 100 at the low vehicle speed, the posture of the saddled vehicle 100 is likely to become unstable. For this reason, in the distance control, the control section 62 may reduce the deceleration of the saddled vehicle 100 as the vehicle speed of the saddled vehicle 100 is reduced.

Alternatively, for example, in the distance control, the control section 62 may control the deceleration of the saddled vehicle 100 based on a slip amount generated on the wheel of the saddled vehicle 100 in addition to the surrounding environment information. The slip amount is an index indicating a degree of a slip of the wheel on a road surface.

For example, a slip rate is used as the slip amount, and is acquired by dividing a difference between the vehicle speed and the wheel rotational frequency by the vehicle speed. The slip rate can be acquired based on the detection result of the front-wheel rotational frequency sensor 42 and the detection result of the rear-wheel rotational frequency sensor 43.

For example, in the case where there is the wheel, the slip amount of which exceeds an allowable slip amount, the control section 62 determines that the wheel is locked or possibly locked, and reduces the braking force generated on the wheel, so as to control the slip amount of the wheel to be equal to or smaller than the allowable slip amount. This control is referred to as anti-lock brake control for regulating the braking force to be generated on the wheel in order to suppress locking of the wheel. The control section 62 may execute the anti-lock brake control in the distance control.

Alternatively, for example, in the distance control, the control section 62 may control the deceleration of the saddled vehicle 100 based on the detection result of the inertial measurement unit 44 mounted to the saddled vehicle 100 in addition to the surrounding environment information. For example, in the case where the significant deceleration is generated on the saddled vehicle 100 in a state where the saddled vehicle 100 is tilted in the rolling direction with respect to the vertical direction, the saddled vehicle 100 is likely to be tilted further significantly with respect to the vertical direction. For this reason, in the distance control, the control section 62 may reduce the deceleration of the saddled vehicle 100 as the lean angle of the saddled vehicle 100 is increased.

Alternatively, for example, in the distance control, the control section 62 may control the deceleration of the saddled vehicle 100 based on a state amount of the first operation in addition to the surrounding environment information. The state amount of the first operation is an index indicating an operation amount in the first operation (more specifically, a rotation angle of the accelerator grip 2R).

For example, the control section 62 may control the deceleration of the saddled vehicle 100 based on the operation amount in the first operation. Here, it is expected that the rider is likely to strongly desire the generation of the greater deceleration to the saddled vehicle 100 as the operation amount in the first operation is increased. For this reason, in the distance control, the control section 62 may increase the deceleration of the saddled vehicle 100 as the operation amount in the first operation is increased. For example, in the case where the rotation angle of the accelerator grip 2R in the first operation is larger than the angle θ2 in FIG. 4, the control section 62 may change the deceleration of the saddled vehicle 100 according to an angle by which the accelerator grip 2R is further rotated beyond the position P2 in FIG. 4.

For example, the control section 62 may control the deceleration of the saddled vehicle 100 based on a magnitude of a change in the operation amount in the first operation. Here, it is expected that the rider is likely to strongly desire the generation of the greater deceleration to the saddled vehicle 100 as the magnitude of the change in the operation amount in the first operation is increased. For this reason, in the distance control, the control section 62 may increase the deceleration of the saddled vehicle 100 as the magnitude of the change in the operation amount in the first operation is increased. For example, the control section 62 may change the deceleration of the saddled vehicle 100 according to a change speed of the rotation angle of the accelerator grip 2R in the first operation.

Alternatively, for example, in the distance control, the control section 62 may control the deceleration of the saddled vehicle 100 based on a state amount of the operation unit (for example, the first brake operation unit 11 or the second brake operation unit 13) other than the accelerator grip 2R of the saddled vehicle 100 in addition to the surrounding environment information. The state amount of the first brake operation unit 11 is an index indicating an operation amount of the first brake operation unit 11. The state amount of the second brake operation unit 13 is an index indicating an operation amount of the second brake operation unit 13.

Here, such a case can be considered that, during execution of the distance control, the rider performs the brake operation by using the first brake operation unit 11 or the second brake operation unit 13. In the case where the brake operation is performed by using the first brake operation unit 11, the braking force corresponding to the operation amount of the first brake operation unit 11 is applied to the front wheel 3. In the case where the brake operation is performed by using the second brake operation unit 13, the braking force corresponding to the operation amount of the second brake operation unit 13 is applied to the rear wheel 4. In the case where the rider performs the brake operation, just as described, for example, the control section 62 may increase the braking force on the front wheel 3 to be larger than the braking force corresponding to the operation amount of the first brake operation unit 11, or may increase the braking force on the rear wheel 4 to be larger than the braking force corresponding to the operation amount of the second brake operation unit 13. For example, when compared to a case where the brake operation using the first brake operation unit 11 or the second brake operation unit 13 is not performed, the deceleration that is generated on the saddled vehicle 100 in the distance control may be increased by the deceleration that is generated by the braking force corresponding to the operation amount in the brake operation. The distance control may compensate for shortfall in the braking force, which corresponds to the operation amount in the brake operation, relative to a target braking force (that is, a required amount of the braking force to generate the target deceleration).

At S204, the control section 62 may increase the braking forces on both of the front wheel 3 and the rear wheel 4, or may increase the braking force on only one of the front wheel 3 and the rear wheel 4. Here, the control section 62 may determine distribution of the braking force between the front wheel 3 and the rear wheel 4 in the distance control. For example, the control section 62 may determine the distribution of the braking force between the front wheel 3 and the rear wheel 4 in the distance control based on information on a travel state (for example, the vehicle speed, the deceleration, or the like) of the saddled vehicle 100. In this way, the distribution of the braking force between the front wheel 3 and the rear wheel 4 of the saddled vehicle 100 can be made to such distribution that stabilizes the posture of the saddled vehicle 100, for example.

In the above example, if it is determined NO at S203, the deceleration of the saddled vehicle 100 is not controlled, and the control flow illustrated in FIG. 7 is terminated. However, if it is determined NO at S203, the control section 62 may cause the generation of a specified magnitude of the deceleration to the saddled vehicle 100 without relying on the brake operation using the first brake operation unit 11 or the second brake operation unit 13.

Hereinafter, the description will continue with reference to FIG. 6 again.

Following S103, at S104, the control section 62 determines whether a second operation has been performed. The second operation is an operation in which the rider returns the accelerator grip 2R to the reference state. More specifically, the second operation is an operation in which the rider rotates the accelerator grip 2R in the first direction D1 to the reference position P0 illustrated in FIG. 4. For example, in the case where the accelerator grip 2R is rotated to the position P2 in FIG. 4 by the first operation, the second operation is an operation to rotate the accelerator grip 2R from the position P2 in FIG. 4 to the reference position P0.

As described above, the accelerator grip 2R is movable to return to the reference position P0 from the rotational position while being unloaded, i.e., in the unloaded state. Thus, when the rider cancels the first operation (more specifically, releases his/her hand performing the first operation from the accelerator grip 2R), the accelerator grip 2R can be rotated in the first direction D1 to the reference position P0. Just as described, the second operation may be an operation in which the rider cancels the first operation so that the accelerator grip 2R becomes unloaded, i.e., so that the accelerator grip 2R is brought into the unloaded state.

If it is determined that the second operation has not been performed (S104/NO), the processing returns to S103. On the other hand, if it is determined that the second operation has been performed (S104/YES), the processing proceeds to S105.

If it is determined YES at S104, at S105, the control section 62 terminates the distance control, and the processing returns to S102.

As described above, the control section 62 initiates the distance control according to the first operation in which the rider changes the reference state of the accelerator grip 2R to the different state from the reference state. Then, during the execution of the distance control, the control section 62 terminates the distance control according to the second operation in which the rider returns the accelerator grip 2R to the reference state. For example, in the control flow illustrated in FIG. 6, while the first operation is performed, the control section 62 executes the distance control. Then, at timing of performing the second operation, the control section 62 terminates the distance control.

For example, in such a case that particular processing is executed according to a particular operation, timing at which the particular operation is performed may precisely match or may not match timing at which the particular processing is executed. For example, timing at which the first operation is initiated may precisely match or may not match timing at which the distance control is initiated. In addition, for example, timing at which the second operation is executed may precisely match or may not match timing at which the distance control is terminated.

According to this embodiment, the rider can initiate and terminate the distance control by performing the first operation and the second operation. Therefore, it is possible to execute the distance control in line with the rider's intention. For example, in the case where the saddled vehicle 100 approaches the preceding vehicle in a situation where neither the accelerator operation nor the brake operation is performed and the saddled vehicle 100 is decelerated by engine braking, the distance control can be executed at intended timing by performing the first operation and the second operation without using the first brake operation unit 11 or the second brake operation unit 13. In this way, with the simple operations, the distance control is executed in line with the rider's intention, and the collision can thereby be avoided. In particular, the posture of the saddled vehicle 100 tends to become unstable when compared to a four-wheeled automobile or the like. Accordingly, in the case where the distance control (for example, the control of the deceleration) is executed at timing unintended by the rider, safety is possibly impaired. Therefore, it is important to execute the distance control in line with the rider's intention from a perspective of improving the safety. As described above, according to this embodiment, it is possible to appropriately improve the safety of the saddled vehicle 100.

The above description has been made on the example in which the operation unit used in the first operation and the second operation as the operations for executing the distance control is the accelerator grip 2R. However, the operation unit according to the present disclosure may be an operation unit other than the accelerator grip 2R (that is, any of various operation units other than the operation unit that accepts the accelerator operation). For example, the operation unit according to the present disclosure may be rotatable about an axis other than the center axis of the operation unit. In addition, for example, the operation unit according to the present disclosure may not have the cylindrical or columnar shape. Furthermore, for example, the operation unit according to the present disclosure may be translatable rather than rotatable. In the case where a translatable operation unit is used in the first operation and the second operation, the first operation and the second operation may each be an operation that translates the operation unit.

The above description has been made on the example in which the deceleration of the saddled vehicle 100 is controlled based on the surrounding environment information in the distance control. However, in the distance control, the control section 62 may control the acceleration of the saddled vehicle 100 based on the surrounding environment information. For example, in the distance control, the control section 62 may determine target acceleration based on the surrounding environment information and controls the drive power of the engine 5 without relying on the accelerator operation, so as to control the acceleration of the saddled vehicle 100 to be the target acceleration. In this case, for example, the target acceleration may be such acceleration that the distance between the preceding vehicle and the saddled vehicle 100 is maintained at a target distance.

From a perspective of optimizing the acceleration of the saddled vehicle 100, in the distance control, the control section 62 preferably controls the acceleration of the saddled vehicle 100 (and thus the distance between the saddled vehicle 100 and the target vehicle) based on another type of information in addition to the surrounding environment information.

For example, in the distance control, the control section 62 may control the acceleration of the saddled vehicle 100 based on the slip amount generated on the wheel of the saddled vehicle 100 in addition to the surrounding environment information. For example, in the case where the slip amount of the drive wheel exceeds the allowable slip amount, the control section 62 determines that the wheel is idling, and reduces the drive power generated on the wheel, so as to control the slip amount of the drive wheel to be equal to or smaller than the allowable slip amount. This control is referred to as traction control for regulating the drive power that is generated on the drive wheel in order to suppress idling of the drive wheel. The control section 62 may execute the traction control in the distance control.

Alternatively, for example, in the distance control, the control section 62 may control the acceleration of the saddled vehicle 100 based on the detection result of the inertial measurement unit 44 mounted to the saddled vehicle

100 in addition to the surrounding environment information. For example, in the case where the significant acceleration is generated on the saddled vehicle 100 in the state where the saddled vehicle 100 is tilted in the rolling direction with respect to the vertical direction, the saddled vehicle 100 is likely to be raised toward the vertical direction. For this reason, in the distance control, the control section 62 may increase the acceleration of the saddled vehicle 100 as the lean angle of the saddled vehicle 100 is increased.

Alternatively, for example, in the distance control, the control section 62 may control the acceleration of the saddled vehicle 100 based on the state amount of the first operation in addition to the surrounding environment information. For example, the control section 62 may control the acceleration of the saddled vehicle 100 based on the operation amount in the first operation. For example, in the distance control, the control section 62 may increase the acceleration of the saddled vehicle 100 as the operation amount in the first operation is increased. Alternatively, for example, the control section 62 may control the acceleration of the saddled vehicle 100 based on the magnitude of the change in the operation amount in the first operation. For this reason, in the distance control, the control section 62 may increase the acceleration of the saddled vehicle 100 as the magnitude of the change in the operation amount in the first operation is increased.

Alternatively, for example, in the case where the operation unit that is used in the first operation and the second operation is not the accelerator grip 2R, in the distance control, the control section 62 may control the acceleration of the saddled vehicle 100 based on the state amount of the operation unit (for example, the accelerator grip 2R) other than such an operation unit of the saddled vehicle 100 in addition to the surrounding environment information. In the case where the rider performs the accelerator operation, for example, the control section 62 may increase the output of the engine 5 to be larger than the output thereof that corresponds to the operation amount in the accelerator operation. For example, when compared to a case where the accelerator operation is not performed, the acceleration that is generated on the saddled vehicle 100 in the distance control may be increased by the drive power that corresponds to the operation amount in the accelerator operation. The distance control may compensate for shortfall in the drive power, which corresponds to the operation amount in the accelerator operation, relative to target drive power.

<Effects of Controller>

A description will be made on effects of the controller 60 according to the embodiment of the present disclosure.

In the controller 60, the control section 62 initiates the distance control according to the first operation in which the rider of the saddled vehicle 100 changes the operation unit (for example, the accelerator grip 2R) from the reference state to the different state from the reference state. Then, during the execution of the distance control, the control section 62 terminates the distance control according to the second operation in which the rider returns the operation unit to the reference state. In this way, it is possible to execute the distance control in line with the rider's intention. Therefore, it is possible to appropriately improve the safety of the saddled vehicle 100.

Preferably, in the controller 60, the operation unit is movable to return to the reference state while being unloaded, and the second operation is the operation in which the rider cancels the first operation so that the operation unit becomes unloaded. In this way, it is possible to avoid the rider's effort of performing the second operation. Thus, the distance control can be terminated by the simple operation. Therefore, it is possible to further appropriately improve the safety of the saddled vehicle 100.

Preferably, in the controller 60, the operation unit is the accelerator grip 2R. In the state where at least the distance control is canceled, the drive power generated to the saddled vehicle 100 is increased when the rider rotates the accelerator grip 2R in the first direction, and the drive power is reduced when the rider rotates the accelerator grip 2R in the second direction as the reverse direction of the first direction. Here, during the travel, a state where the accelerator grip 2R is grasped by the rider's hand is basically maintained. Thus, in the case where the accelerator grip 2R is used as the operation unit, it is possible to avoid the rider's effort of moving his/her hand from the accelerator grip 2R to the other operation unit at the time of performing the first operation. Therefore, it is possible to further appropriately improve the safety of the saddled vehicle 100.

Preferably, in the controller 60, the first operation is the operation to rotate the accelerator grip 2R in the second direction, and the second operation is the operation to rotate the accelerator grip 2R in the first direction. Accordingly, the first operation can be performed by rotating the accelerator grip 2R in the same direction as the direction in the case of reducing the drive power in the accelerator operation. As a result, the rider can easily and appropriately distinguish between the accelerator operation using the accelerator grip 2R and the first operation.

Therefore, the first operation can be performed without the erroneous operation.

Preferably, in the controller 60, in the reference state, the rotational position of the accelerator grip 2R is the position where the drive power generated to the saddled vehicle 100 is minimized in the state where the distance control is canceled. Accordingly, the rider can easily and appropriately distinguish between the accelerator operation using the accelerator grip 2R and the first operation. Therefore, the first operation can be performed without the erroneous operation.

Preferably, in the distance control, the control section 62 of the controller 60 controls the deceleration of the saddled vehicle 100 based on the surrounding environment information. In this way, it is possible to suppress the distance between the saddled vehicle 100 and the target vehicle from becoming excessively short. Therefore, for example, it is possible to avoid the collision with the target vehicle.

Preferably, in the distance control, the control section 62 of the controller 60 controls the deceleration based on the vehicle speed of the saddled vehicle 100 in addition to the surrounding environment information. In this way, it is possible to suppress the distance between the saddled vehicle 100 and the target vehicle from becoming excessively short while suppressing the posture of the saddled vehicle 100 from becoming unstable.

Preferably, in the controller 60, the control section 62 determines the distribution of the braking force between the front wheel 3 and the rear wheel 4 in the distance control. In this way, it is possible to suppress the distance between the saddled vehicle 100 and the target vehicle from becoming excessively short while optimizing the distribution of the braking force between the front wheel 3 and the rear wheel 4 to such distribution that stabilizes the posture of the saddled vehicle 100, for example.

Preferably, in the distance control, the control section 62 of the controller 60 controls the acceleration of the saddled vehicle 100 based on the surrounding environment information. In this way, it is possible to suppress the distance between the saddled vehicle 100 and the target vehicle from becoming excessively long. Therefore, for example, it is possible to maintain the distance from the target vehicle at the target distance.

Preferably, in the distance control, the control section 62 of the controller 60 controls the distance based on the slip amount generated on the wheel in addition to the surrounding environment information. For example, the control section 62 may execute the anti-lock brake control in the distance control. In this way, it is possible to suppress locking of the wheel in the distance control. In addition, for example, the control section 62 may execute the traction control in the distance control. In this way, it is possible to suppress idling of the drive wheel in the distance control.

Preferably, for example, in the distance control, the control section 62 of the controller 60 controls the distance based on the detection result of the inertial measurement unit 44 mounted to the saddled vehicle 100 in addition to the surrounding environment information. In this way, it is possible to control the distance while suppressing the posture of the saddled vehicle 100 from becoming unstable.

Preferably, in the distance control, the control section 62 of the controller 60 controls the distance based on the state amount of the first operation in addition to the surrounding environment information. In this way, it is possible to control the distance between the saddled vehicle 100 and the target vehicle further in line with the rider's intention.

Preferably, in the distance control, the control section 62 of the controller 60 controls the distance based on the state amount of the operation unit other than the above operation unit of the saddled vehicle 100 in addition to the surrounding environment information. In this way, it is possible to control the distance between the saddled vehicle 100 and the target vehicle further in line with the rider's intention.

The present disclosure is not limited to the embodiment that has been described. For example, only a part of the embodiment may be implemented. In addition, for example, the above-described distance control may be adaptive cruise control. In the adaptive cruise control, distance maintenance control is executed to automatically control the speed of the saddled vehicle 100 without relying on the acceleration/deceleration operation by the rider, so as to maintain the distance between the saddled vehicle 100 and the target vehicle at the target distance. Furthermore, for example, during execution of the auto-cruise control in which the distance maintenance control is not executed while the speed of the saddled vehicle 100 is automatically controlled without relying on the acceleration/deceleration operation by the rider, the distance control (for example, the adaptive cruise control) may be initiated according to the first operation.

REFERENCE SIGNS LIST

1: Trunk
2: Handlebar
2L: Left grip
2R: Right grip (accelerator grip)
3: Front wheel
3a: Rotor
4: Rear wheel
4a: Rotor
5: Engine
10: Brake system
11: First brake operation unit
12: Front-wheel brake mechanism
13: Second brake operation unit
14: Rear-wheel brake mechanism

18

15: Clutch operation unit
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Surrounding environment sensor
42: Front-wheel rotational frequency sensor
43: Rear-wheel rotational frequency sensor
44: Inertial measurement unit
50: Hydraulic pressure control unit
51: Base body
60: Controller
61: Acquisition section
62: Control section
62a: Drive control section
62b: Brake control section
70: Display device
100: Saddled vehicle
D1: First direction
D2: Second direction
P0: Reference position

The invention claimed is:

1. A controller for a saddled vehicle, the controller configured to:

maneuver the saddled vehicle, execute a distance control in which a distance between the saddled vehicle and a target vehicle is controlled based on surrounding environment information of the saddled vehicle, initiate the distance control according to a first operation in which a rider of the saddled vehicle operates an operation unit to change a reference state of the operation unit to a predetermined different state that is different from the reference state; and terminate the distance control according to a second operation in which the rider returns the operation unit to the reference state during execution of the distance control, wherein the operation unit is an accelerator grip that is rotatable in an accelerating direction and a decelerating direction opposite to the accelerating direction, at least while the distance control is being canceled, the accelerator grip:

generates a drive power to the saddled vehicle when the rider rotates the accelerator grip in the accelerating direction; and reduces the drive power when the rider rotates the accelerator grip in the decelerating direction, wherein the first operation is an operation to rotate the accelerator grip in the decelerating direction, the second operation is an operation for returning to the reference state by rotating the accelerator grip in the accelerating direction, the operation unit is movable to return to the reference state while being unloaded, and in the second operation, the rider cancels the first operation so that the operation unit becomes unloaded.

2. The controller according to claim 1, wherein in the reference state, a rotational position of the accelerator grip is a position where the drive power generated to the saddled vehicle is minimized while the distance control is canceled.

3. The controller according to claim 1, wherein in the distance control, the controller is further configured to control a deceleration of the saddled vehicle based on the surrounding environment information.

4. The controller according to claim 3, wherein in the distance control, the controller is further configured to control the deceleration based on a speed of the saddled vehicle in addition to the surrounding environment information.

5. The controller according to claim 3, wherein the controller is further configured to set-a rate between a braking force applied to a front wheel and a braking force applied to a rear wheel in the distance control.

6. The controller according to claim 1, wherein in the distance control, the controller is further configured to control an acceleration of the saddled vehicle based on the surrounding environment information.

7. The controller according to claim 1, wherein in the distance control, the controller is further configured to control a distance based on a slip amount generated on a wheel in addition to the surrounding environment information.

8. The controller according to claim 1, wherein in the distance control, the controller is further configured to control the distance based on a detection result of an inertial measurement unit mounted to the saddled vehicle in addition to the surrounding environment information.

9. The controller according to claim 1, wherein in the distance control, the controller is further configured to control the distance based on a state amount of the first operation in addition to the surrounding environment information.

10. The controller according to claim 1, wherein in the distance control, the controller is further configured to control the distance based on a state amount of another operation unit of the saddled vehicle other than the operation unit in addition to the surrounding environment information.

11. A control method for maneuvering a saddled vehicle, the control method comprising:

executing, using a controller, a distance control in which a distance between the saddled vehicle and a target vehicle is controlled, executing the distance control based on surrounding environment information of the saddled vehicle, initiating the distance control according to a first operation in which a rider of the saddled vehicle operates an operation unit to change a reference state of the operation unit to a predetermined different state that is different from the reference state; and terminating the distance control according to a second operation in which the rider returns the operation unit to the reference state during execution of the distance control, wherein the operation unit is an accelerator grip that is rotatable in an accelerating direction and a decelerating direction opposite to the accelerating direction, and at least while the distance control is being canceled, the accelerator grip:

generating a drive power to the saddled vehicle when the rider rotates the accelerator grip in the accelerating direction; and reducing the drive power when the rider rotates the accelerator grip in the decelerating direction, wherein the first operation is an operation to rotate the accelerator grip in the decelerating direction, and the second operation is an operation for returning to the reference state by rotating the accelerator grip in the accelerating direction, moving the operation unit to return to the reference state while being unloaded, and cancelling the first operation, while in the second operation, so that the operation unit becomes unloaded.

12. The controller according to claim 1, wherein the controller is configured to only initiate the distance control when the rider performs the first operation, wherein the first operation includes the rider rotating the operating unit from a reference state to a predetermined different state in the decelerating direction.

13. The controller according to claim 1, wherein the controller is further configured to terminate the distance control when the rider performs the second operation, wherein the second operation includes the rider rotating the operating unit from a predetermined different state to a reference state in the accelerating direction, wherein the second operation further includes the rider rotating the operating unit from the reference state to a second predetermined different state in the accelerating direction.

14. The control method according to claim 11, wherein initiating the distance control when the rider performs the first operation, wherein the first operation includes the rider rotating the operating unit from a reference state to a predetermined different state in the decelerating direction.

15. The control method according to claim 11, wherein terminating the distance control when the rider performs the second operating, wherein the second operating includes the rider rotating the operating unit from a predetermined different state to a reference state in the accelerating direction, wherein the second operating further includes the rider rotating the operating unit from the reference state to a second predetermined different state in the accelerating direction.

16. A controller for a saddled vehicle, the controller configured to:

maneuver the saddled vehicle, execute a distance control in which a distance between the saddled vehicle and a target vehicle is controlled based on surrounding environment information of the saddled vehicle, initiate the distance control according to a first operation in which a rider of the saddled vehicle operates an operation unit to change a reference state of the operation unit to a predetermined different state that is different from the reference state; and terminate the distance control according to a second operation in which the rider returns the operation unit to the reference state during execution of the distance control, wherein the operation unit is an accelerator grip that is rotatable in an accelerating direction and a decelerating direction opposite to the accelerating direction, at least while the distance control is being canceled, the
accelerator grip:

generates a drive power to the saddled vehicle when the
rider rotates the accelerator grip in the accelerating
direction; and reduces the drive power when the rider rotates the
accelerator grip in the decelerating direction,
wherein the first operation is an operation to rotate
the accelerator grip in the decelerating direction, and the second operation is an operation for returning to the
reference state by rotating the accelerator grip in the
accelerating direction; and only initiate the distance control when the rider per-
forms the first operation, wherein the first operation
includes the rider rotating the operating unit from a
reference state to a predetermined different state in
the decelerating direction.

\* \* \* \* \*